US010044386B2

(12) United States Patent
Demirtas

(10) Patent No.: US 10,044,386 B2
(45) Date of Patent: Aug. 7, 2018

(54) DESIGNING FIR FILTERS WITH GLOBALLY MINIMAX-OPTIMAL MAGNITUDE RESPONSE

(71) Applicant: ANALOG DEVICES, INC., Norwood, MA (US)

(72) Inventor: Sefa Demirtas, Malden, MA (US)

(73) Assignee: ANALOG DEVICES, INC., Norwood, MA (US)

(*) Notice: Subject to any disclaimer, the term of this patent is extended or adjusted under 35 U.S.C. 154(b) by 0 days.

(21) Appl. No.: 15/271,487

(22) Filed: Sep. 21, 2016

(65) Prior Publication Data

US 2017/0317701 A1   Nov. 2, 2017

Related U.S. Application Data

(60) Provisional application No. 62/330,084, filed on Apr. 30, 2016.

(51) Int. Cl.
*H03D 1/00* (2006.01)
*H04B 1/10* (2006.01)
*H04L 25/03* (2006.01)

(52) U.S. Cl.
CPC ... *H04B 1/1027* (2013.01); *H04B 2001/1054* (2013.01); *H04L 25/03853* (2013.01)

(58) Field of Classification Search
CPC .................................................. H04B 1/1027
USPC ......................................................... 375/343
See application file for complete search history.

(56) References Cited

U.S. PATENT DOCUMENTS 5,602,765 A     2/1997  Tanaka et al.
5,999,954 A *  12/1999  Ludwig .............. H03H 21/0012
                                                                708/312
2003/0074381 A1  4/2003  Awad et al.
(Continued)

FOREIGN PATENT DOCUMENTS

EP          1089507          4/2001

OTHER PUBLICATIONS

International Search Report and Written Opinion issued in International Patent Application Serial No. PCT/US2017/028039 dated Aug. 6, 2017, 6 pages.

(Continued)

*Primary Examiner* — Lihong Yu
(74) *Attorney, Agent, or Firm* — Patent Capital Group

(57) ABSTRACT

Embodiments of the present disclosure provide mechanisms that enable designing an FIR filter that would have a guaranteed globally optimal magnitude response in terms of the minimax optimality criterion given a desired weight on the error in the stopband versus the passband. Design of such a filter is based on a theorem ("characterization theorem") that provides an approach for characterizing the global minimax optimality of a given FIR filter $h[n]$, $n=0, 1, \ldots$, N, where optimality is evaluated with respect to a magnitude response of this filter, $|H(e^{j\omega})|$, as compared to the desired filter response, $D(\omega)$, which is unity in the passband and zero in the stopband. The characterization theorem enables characterizing optimality for both real-valued and complex-valued filter coefficients, and does not require any symmetry in the coefficients, thus being applicable to all non-linear phase FIR filters.

22 Claims, 6 Drawing Sheets

(56) References Cited

U.S. PATENT DOCUMENTS

| | | | |
|---|---|---|---|
| 2008/0082294 A1* | 4/2008 | Pihlaja | G05B 23/024 |
| | | | 702/179 |
| 2013/0253917 A1 | 9/2013 | Schildbach | |
| 2015/0032788 A1* | 1/2015 | Velazquez | H04L 27/265 |
| | | | 708/819 |

OTHER PUBLICATIONS

R. Boite et al., *A New Procedure for the Design of High Order Minimum Phase Fir Digital or CCD Filters*, Signal Processing 3 (1981) 101-108, North-Holland Publishing Company, 8 pages.

Xiangkun Chen et al., *Design of Optimal Minimum Phase Fir Filters by Direct Factorization*, Signal Processing 10 (1986) 369-383, 0165-1684/86 © 1986, Elsevier Science Publishers B.V. (North-Holland), 15 pages.

Niranjan Damera-Venkata et al., *Optimal Design of Real and Complex Minimum Phase Digital Fir Filters*, Acoustics, Speech and Signal Processing, 1988, ICASSP—88, 1998 International Conference on 3:1145-1148, vol. 3, Apr. 1999, 4 pages.

Sefa Demirtas, *Minimax Design of Nonlinear Phase FIR Filters with Optimality Certificates*, arXiv:1608.03161v1, Aug. 10, 2016, 8 pages.

*Design of Nonrecursive Digital Filters with Minimum Phase*, Electronics Letters May 28, 2970, vol. 6, No. 11, 2 pages.

Yves Kamp et al., *Optimal Design of Minimum-Phase FIR Filters*, IEEE Transactions on Acoustics, Speech and Signal Processing, vol. ASSP-31, No. 4, Aug. 1983, 5 pages.

Gian Antonio Mian et al., *A Fast Procedure to Design Equiripple Minimum-Phase FIR Filters*, 0098-4094/82/0300-0327 © 1982, IEEE, 5 pages.

Per Lowenborg et al., *Minimax Design of Adjustable-Bandwidth Linear-Phase FIR Filters*, IEEE Transactions on Circuits and Systems-I: Regular Papers, vol. 52, No. 2, Feb. 2006, 9 pages.

Wu-Sheng Lu et al., *Minimax Design of Complex-Coefficient FIR Filters with Low Group Delay*, May 23, 2006, 5 pages.

Liron D. Grossman et al., *The Design of Optimal L1 Linear Phase Fir Digital Filters*, ICASSP 2006, 1-4244-0469-X/06 © 2006 IEEE, 4 pages.

\* cited by examiner

DESIGNING FIR FILTERS WITH GLOBALLY MINIMAX-OPTIMAL MAGNITUDE RESPONSE

CROSS-REFERENCE TO RELATED APPLICATIONS

This application claims the benefit of and priority from U.S. Provisional Patent Application Ser. No. 62/330,084 filed 30 Apr. 2016 entitled "DESIGNING FIR FILTERS WITH GLOBALLY MINIMAX-OPTIMAL MAGNITUDE RESPONSE," which is incorporated herein by reference in its entirety.

TECHNICAL FIELD OF THE DISCLOSURE

The present invention relates to the field of digital signal processing, in particular to designing finite impulse response (FIR) filters.

BACKGROUND

As is well known, an electromagnetic receiver is an electronic device that receives electromagnetic waves in a certain range of frequencies and converts the information carried by these waves into some kind of a usable form. For example, a receiver that is typically referred to as a "radio receiver" receives electromagnetic waves in the radio range of approximately 3 kiloHertz (kHz) to 300 gigaHertz (GHz). All receivers use antennas to capture the waves and convert them to alternating current (AC) signals, and electronic filters to separate the signals in the desired band of frequencies from all other signals that may be captured by the antenna. In context of receivers, different bands of frequencies are sometimes referred to as "channels."

Selectivity performance of a receiver refers to a measure of the ability of the receiver to separate the desired range of frequencies (referred to as a "passband $\Omega_P$" of frequencies $\omega$) from unwanted interfering signals received at other frequencies (referred to as a "stopband $\Omega_S$" of frequencies $\omega$). In other words, selectivity defines how effectively a receiver can respond only to the signal of interest that it is tuned to (i.e., signal in the desired band of frequencies) and reject signals in other frequencies.

Filters can be classified in different groups, depending on which criteria are used for classification. Two major types of digital filters are finite impulse response (FIR) digital filters and infinite impulse response (IIR) digital filters, with each type having its own advantages and disadvantages.

An FIR filter is designed by finding coefficients and filter order that meet certain specifications. In other words, in a filter design setting, "filter design" refers to determining a filter order N and determining values of (N+1) coefficients h[n] of a filter that would approximate the ideal response defined by the specifications both in the passband and in the stopband. In this context, a filter order N is a positive integer, and, for each coefficient, n is an integer of a sequence of consecutive integers from 0 to N (i.e. n=0, 1, ..., N). Thus, for example, for a second-order filter (i.e. N=2), coefficients may be denoted as h[0], h[1], and h[2].

The specifications of an ideal response that a filter being designed should meet are typically expressed based on the desired selectivity performance of a receiver. Such specifications could be defined in terms of e.g. a frequency response $H(e^{j\omega})$ (i.e. a Fourier transform of the impulse response h[n]) provided with the passband $\Omega_P$ and the stopband $\Omega_S$ of frequencies to approximate the desired magnitude response $D(\omega)$:

$$D(\omega) = \begin{cases} 1, & \omega \in \Omega_P \\ 0, & \omega \in \Omega_S \end{cases} \quad (1)$$

A further specification could include a desired weight function $W_{des}(\omega)$ (where the subscript "des" is an abbreviation for "desired"), specifying the relative emphasis on the error in the stopband as compared to the passband. More specifically, the weight requirement could be expressed as $$W_{des}(\omega) = \begin{cases} 1, & \omega \in \Omega_P \\ K_{des}, & \omega \in \Omega_S \end{cases} \quad (2)$$

where $K_{des}$ is a positive scalar given as a part of the filter specifications. Providing a weight greater than unity on the stopband places an emphasis on having a better approximation to the ideal response in the stopband (i.e. the designed filter should adequately suppress the frequencies of the stopband).

Many FIR filter design methods exist, such as e.g. windowing design method, frequency sampling method, weighted least squares design, Parks-McClellan method, etc., all of which attempt to arrive at the filter coefficients h[n] of a filter that best approximates an ideal filter response provided by the specifications. Some of these methods can guarantee that for a given value of filter order N, and certain conditions imposed on h[n], the result is the best approximation possible for these conditions. For example applying a rectangular window of size N+1 to the ideal filter response results in the best approximation in terms of mean-squared error optimality criterion. Another example is that if the filter is restricted to be symmetric around its mid-index, Parks-McClellan filter design method yields the best minimax approximation, i.e. minimizes the maximum error. However, finding coefficients for FIR filters with non-linear phase characteristics, i.e. for the most general form of FIR filters where the phase response of a filter may be a non-linear function of frequency, remains challenging if the optimality criterion is minimizing the maximum error. Improvements could be made with respect to addressing one or more of these issues.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Figure 1A:
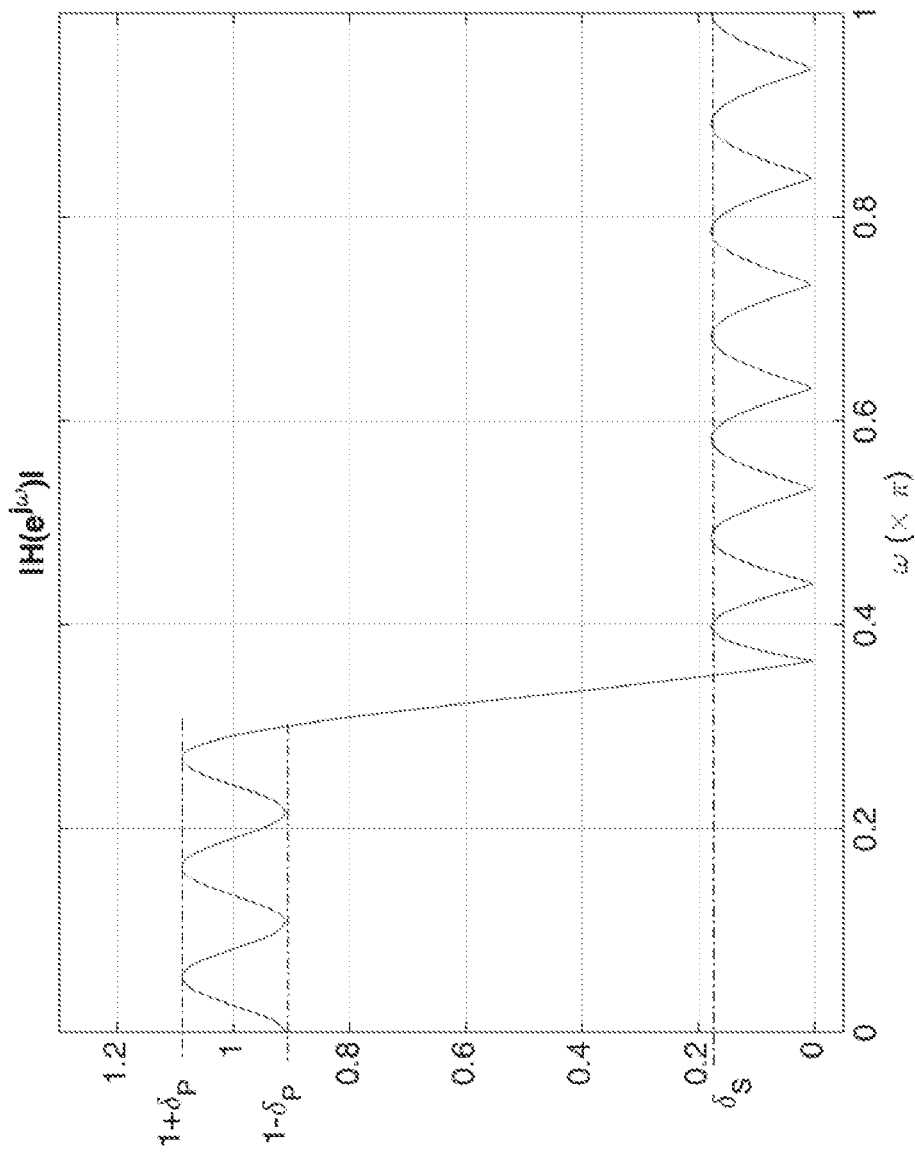
FIG. 1A illustrates an example of a magnitude response ($|H(e^{j\omega})|$, i.e. the absolute value) of the frequency response (Fourier transform) of filter h[n] as a function of $\omega$, according to some embodiments of the disclosure.

Challenges with Minimax Optimality for Generic FIR Filters

Minimax optimality criterion is concerned with minimizing the maximum value of the error. In a filter design setting (i.e. when coefficients of a filter are being computed), a designed filter will typically approximate the ideal response in both the passband and the stopband to a certain extent. Furthermore, it is possible to apply a certain weight on the stopband so that more emphasis is placed on having a better approximation in the stopband. The maximum value of the absolute value of the weighted error on the entire frequency range including the stopband and the passband is called the $l_\infty$ norm of the weighted error ($l_\infty$ pronounced as "ell-infinity"). Minimax filter design refers to the process of finding filter coefficients of a certain order that will minimize the $l_\infty$ error, i.e. minimize the maximum weighted error encountered in the entire frequency range.

In order to further explain how a minimax optimal filter is evaluated, a hypothetical filter, A, may be considered. For the hypothetical filter A, the weighted error may swing between −0.01 and 0.01 everywhere on the frequency axis, except that at the frequency $\omega=0.30\pi$ the value of the weighted error is 0.20. The $l_\infty$ norm of this error function is 0.20. Another hypothetical filter, B, may also be considered. For the hypothetical filter B, the error may swing between −0.19 and 0.19 everywhere but never gets larger than this. The $l_\infty$ norm of this error is 0.19. Even though filter A approximates the ideal response much better than filter B at almost every frequency, the minimax error criterion favors filter B over filter A, because filter B is "safer" for the worst case scenario (which, in this exemplary illustration, would happen if the entire input was concentrated at $\omega=0.30\pi$). Thus, a minimax design can be viewed as being prepared for the worst case.

Linear phase filters (i.e. filters for which phase characteristic is a linear function of frequency) have certain symmetries around their mid-point, which allows their frequency response to be written as a real-valued zero-phase response multiplied by a linear phase term. Since the alternation theorem and the Remez exchange algorithm deal only with real-valued functions, they can be directly applied to characterize or design globally minimax-optimal linear phase filters by only considering the real part of the frequency response. A generic FIR with no such symmetry constraints would allow more flexibility in choosing its coefficients and can be more advantageous than linear phase filters. However, since the frequency response of a non-linear FIR filter may not necessarily be expressed as a real-valued function multiplied by a linear phase term as is done for linear phase filters, the alternation theorem and the Remez Exchange method cannot be applied for globally minimax-optimal design of generic filters which may include non-linear filters. There have been approaches in the literature to carry the design problem to the domain of the autocorrelation of the filter instead of the domain of the filter itself, an idea that is also utilized in the present disclosure. However, these approaches in the literature do not adhere to a well-defined optimality criterion in the filter domain. Rather, these approaches find an optimal filter in the autocorrelation domain, which, when converted back to the filter domain, may not remain optimal or may not exhibit the desired emphasis on attenuation in the stopband versus the passband specified by the weight function $W_{des}$.

Overview

Embodiments of the present disclosure provide mechanisms that enable implementing a digital filter that may improve on one or more problems described above, in particular with respect to designing an FIR filter that would have a guaranteed globally optimal magnitude response in terms of the minimax optimality criterion. Designing and then applying such a filter to filter input signals provides an advantageous technological solution to a problem of suboptimal conventional filters (i.e. a problem rooted in technology).

Design of such a filter is based on a practical application of a theorem derived by the inventor of the present disclosure. The theorem may be referred to as a "characterization theorem" to reflect the fact that it provides an approach for characterizing the global minimax optimality of a given FIR filter h[n], n=0, 1, . . . , N, where the optimality is evaluated with respect to the magnitude response of this filter, $|H(e^{j\omega})|$, as compared to the desired filter response, $D(\omega)$, which is unity in the passband $\Omega_P$ and zero in the stopband $\Omega_S$. In particular, the characterization theorem allows evaluating whether a given filter has a magnitude response that is the best approximation to $D(\omega)$ in that no other magnitude response can be achievable for the same order of FIR filters that would attain a smaller infinity norm on the weighted error function $W_{des}(\omega)(|H(e^{j\omega})|-D(\omega))$. The characterization theorem enables characterizing optimality for both real-valued and complex-valued filter coefficients, and does not require any symmetry in the coefficients, thus being applicable to all non-linear phase FIR filters.

In turn, observations from the characterization theorem enable an efficient method, as described herein, for designing non-linear phase FIR filters in cases where only the magnitude response is specified and the phase is not constrained. Such a method is referred to herein as a "FIR filter design method." While the FIR filter design method is not restricted to a particular phase response, it, nevertheless, advantageously allows to choose a desired phase design, e.g. minimum phase design, without compromising global optimality of the filter with respect to magnitude. The next section sets forth the characterization theorem, provided for sake of completeness in terms of mathematical proof of the optimality of the FIR filter design method proposed herein. After that, the filter design method is described.

As will be appreciated by one skilled in the art, aspects of the present disclosure, in particular the FIR filter design approach described herein, may be embodied in various manners—e.g. as a method, a system, a computer program product, or a computer-readable storage medium. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." At least some functions described in this disclosure may be implemented as an algorithm executed by one or more processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer readable medium(s), preferably non-transitory, having computer readable program code embodied, e.g., stored, thereon. In various embodiments, such a computer program may, for example, be downloaded (updated) to the existing devices and systems (e.g. to the existing filter modules, electromagnetic receivers or controllers of such filters or receivers, etc.) or be stored upon manufacturing of these devices and systems.

Other features and advantages of the disclosure are apparent from the following description, and from the claims and examples.

Characterization Theorem

Assume that a filter with coefficients h[n], n=0, 1, ... N, and a frequency response $H(e^{j\omega})$ is provided with the passband $\Omega_P$ and the stopband $\Omega_S$ of frequencies to approximate the desired magnitude response $D(\omega)$ defined by equation (1) above.

Further assume a desired weight function $W_{des}(\omega)$ specifying the relative emphasis on the suppression of error in the stopband as compared to the passband by equation (2) above. The scalar $K_{des}$ may be given as a part of design specification (i.e. be provided as an input to the FIR filter design method/algorithm described herein).

The weighted error function $E_W(\omega)$ achieved by the designed filter h[n], and the bounds on passband error $\delta_P$ (i.e. the maximum (absolute) deviation of $|H(e^{j\omega})|$ from unity in the passband) and stopband error $\delta_S$ (i.e. the maximum (absolute) deviation of $|H(e^{j\omega})|$ from unity in the stopband) may be defined as $$E_W(\omega) = W_{des}(\omega)(|H(e^{j\omega})| - D(\omega)), \quad (3)$$

$$\delta_P = \max_{\omega \in (\Omega_p \cup \Omega_s)} |E_W(\omega)| \quad (4)$$

and $$\delta_S = \frac{\delta_P}{K_{des}}, \quad (5)$$

respectively.

The characterization theorem may then be formulated as follows:

$|H(e^{j\omega})|$ is the unique minimax-optimal magnitude response then can be attained by any FIR filter of order N in order to approximate the ideal filter magnitude response $D(\omega)$ with a desired weight function $W_{des}(\omega)$ if and only if the adjusted weighted error function $$E'_W(\omega) = W'_{des}(\omega)(|H(e^{j\omega})| - D'(\omega)) \quad (6)$$

exhibits at least N+2 alternations if the filter coefficients h[n] are restricted to be real-valued or exhibits 2N+2 alternations if the filter coefficients h[n] are not restricted to be real-valued; where, the adjusted desired weight function, $W'_{des}(\omega)$, is defined as $$W'_{des}(\omega) = \begin{cases} 1, & \omega \in \Omega_p \\ 2K_{des}, & \omega \in \Omega_s \end{cases}, \quad (7)$$

and the adjusted desired/target magnitude response, $D'(\omega)$, is defined as $$D'(\omega) = \begin{cases} 1, & \omega \in \Omega_p \\ \dfrac{\delta_S}{2}, & \omega \in \Omega_s \end{cases}. \quad (8)$$

As is known in the art, "alternations" are defined as the frequency points at which the weighted error function attains its extremal values, where an extremal value is considered to be an alternation if its sign is opposite of the previous extremal value and its magnitude is equal to the magnitude of the previous extremal value (a positive alternation is followed by a negative alternation with the same magnitude and vice versa). In general, a term "extremal value" refers to a local minimum or a local maximum value, i.e. a point with a lower or larger value than its neighboring points, respectively. The optimality in linear phase filters are characterized by counting the alternations with respect to the weighted error function computed using the desired response and the provided desired weight function. The characterization provided herein for the magnitude response, as opposed the frequency response, deals with adjusted weighted error function as described in equation (6) above. Such an adjustment can be mathematically proven, but already intuitively such an adjustment appears to be needed because magnitudes that can never go below zero. The adjusted desired/target magnitude response $D'(\omega)$ in the passband may be chosen as the midpoint of the error band $[1-\delta_P, 1+\delta_P]$ while the adjusted desired/target magnitude response $D'(\omega)$ in the stopband may be chosen as the midpoint of the error band $[0, \delta_S]$.

The number of required alternations for filters with complex-valued coefficients are larger than that of filters with real-valued coefficients. This also is consistent with intuition because it reflects the additional degrees of freedom in choosing the filter coefficients by relaxing the constraint to be real-valued, and can also be mathematically proven.

Proposed FIR Filter Design

In the following, design algorithm for filters restricted to having real-valued coefficients are described. Therefore, (N+2) alternations are required. However, reasoning provided below applies for filters with complex-valued coefficients simply by requiring (2N+2) alternations, i.e. by replacing all occurrences of (N+2) with (2N+2).

A. Observations from Characterization Theorem

The observations and method described herein will refer to N+2 alternations assuming h[n] is restricted to have real-valued coefficients for simplicity of arguments, while the same arguments will apply to the case for complex-valued coefficients with 2N+2 alternations. The characterization theorem formulated above requires the adjusted weighted error $E'_W(\omega)$ to have at least N+2 alternations in total over the passband and stopband. Due to the sufficiency for unique optimality, it is possible to proceed to find a filter that actually satisfies N+2 alternations in the $E'_W(\omega)$. While doing this, the fact that the frequencies at which alternations occur in $E'_W(\omega)$ are also the alternation frequencies for the adjusted weighted error $E'_P(\omega)$ for the frequency response $P(e^{j\omega})$ of the autocorrelation function (i.e. Fourier transform of p[n]) can be used, where error $E'_P(\omega)$ is defined similarly to $E'_W(\omega)$. More specifically, if $|H(e^{j\omega})|$ attains its extremal value at a specific frequency and hence form an alternation in $E'_W(\omega)$, then the Fourier transform of the autocorrelation function $P(e^{j\omega}) = |H(e^{j\omega})|^2$ will also attain its extremal value and form an alternation in error $E'_P(\omega)$ at the same frequency. Due to the specific choices of weighted errors $E'_W(\omega)$ and $E'_P(\omega)$ for $|H(e^{j\omega})|$ and $P(e^{j\omega})$, respectively, they have an equal number of alternations.

Establishing that $E'_W(\omega)$ and error $E'_P(\omega)$ have the same number of alternations advantageously enables carrying out the design into the autocorrelation domain, obtaining an autocorrelation function that satisfies the required number of alternations, and recovering the filter coefficients that will accept this function as its autocorrelation function. Designing an autocorrelation function that will have enough alternations is much easier than designing the original filter because the autocorrelation function is a zero-phase sequence. More specifically the autocorrelation $p[n]$ of an Nth order filter $h[n]$ is of length 2N+1; even-symmetric if $h[n]$ has real-valued coefficients, or conjugate-symmetric if $h[n]$ has complex-valued coefficients. This allows its Fourier transform $P(e^{j\omega})$ to be expressed as a real-valued function that is a linear combination of cosines if even-symmetric, or a linear combination of sines and cosines if conjugate-symmetric. In both cases, the alternation theorem and the Remez Exchange algorithm, as well as many other efficient algorithms known in the art, can be used to successfully characterize and design the optimal autocorrelation sequence.

B. Two-Step Design Algorithm

Designing a zero-phase sequence that approximates an ideal filter response and treating that as the autocorrelation of an FIR filter has been used as a non-linear phase FIR filter design method in the past. However, since the design specifications such as relative weight on stopband versus passband in the autocorrelation domain do not remain the same for the filter due to the squaring relationship between $P(e^{j\omega})$ and $|H(e^{j\omega})|$, the resulting filter does not necessarily reflect the desired weight. Furthermore, no optimality arguments are available for the final design because the optimality of the autocorrelation sequence for one set of metrics does not make the corresponding filter optimal for the same metrics.

A characterization algorithm proposed herein can be viewed as the proof that one only needs to design the autocorrelation sequence such that (i) $E'_P(\omega)$ has at least N+2 alternations, (ii) $|H(e^{j\omega})|=\sqrt{P(e^{j\omega})}$ swings symmetrically around unity in the passband, i.e. its extremal values become $1+\delta_P$ and $1-\delta_P$ for some positive $\delta_P$, and (iii) the maximum value $\delta_S$ of $|H(e^{j\omega})|=\sqrt{P(e^{j\omega})}$ in the stopband satisfies the desired weight constraint, i.e., $$\frac{\delta_P}{\delta_S} = K_{des}.$$

By the uniqueness of the globally minimax-optimal magnitude response from the characterization theorem provided above, when such an autocorrelation function is found, then $|H(e^{j\omega})|=\sqrt{P(e^{j\omega})}$ will be the optimal solution. The actual filter coefficients can be obtained by spectral factorization of $p[n]$ or any other technique known in the art for recovering the original function from its autocorrelation sequence, all of which are within the scope of the present disclosure. There will be more than one choice for the filter, all of which have the same magnitude response, including a minimum phase choice and a maximum phase choice among all others. The relationship between the extremal values of magnitude response $|H(e^{j\omega})|$ and that of $P(e^{j\omega})=|H(e^{j\omega})|^2$ are given in FIGS. 1A and 1B.

Two steps of the design algorithm can be summarized as follows.

In the first step, an autocorrelation function $p[n]$ is designed such that the Fourier transform of the autocorrelation function, $P(e^{j\omega})$, satisfies the properties listed above. Such an autocorrelation function may be designed using any suitable method as known in the art. In some embodiments, such an autocorrelation function may be designed using the approach proposed in Section C below.

In the second step, a filter $h[n]$ is determined such that its magnitude response $|H(e^{j\omega})|$ satisfies $|H(e^{j\omega})|=\sqrt{P(e^{j\omega})}$. Any suitable methods as known in the art may be used to obtain such a filter, including but not limited to e.g. a spectral factorization of $p[n]$ method.

C. An Algorithm to Design Optimal Autocorrelation

Figure 1B:
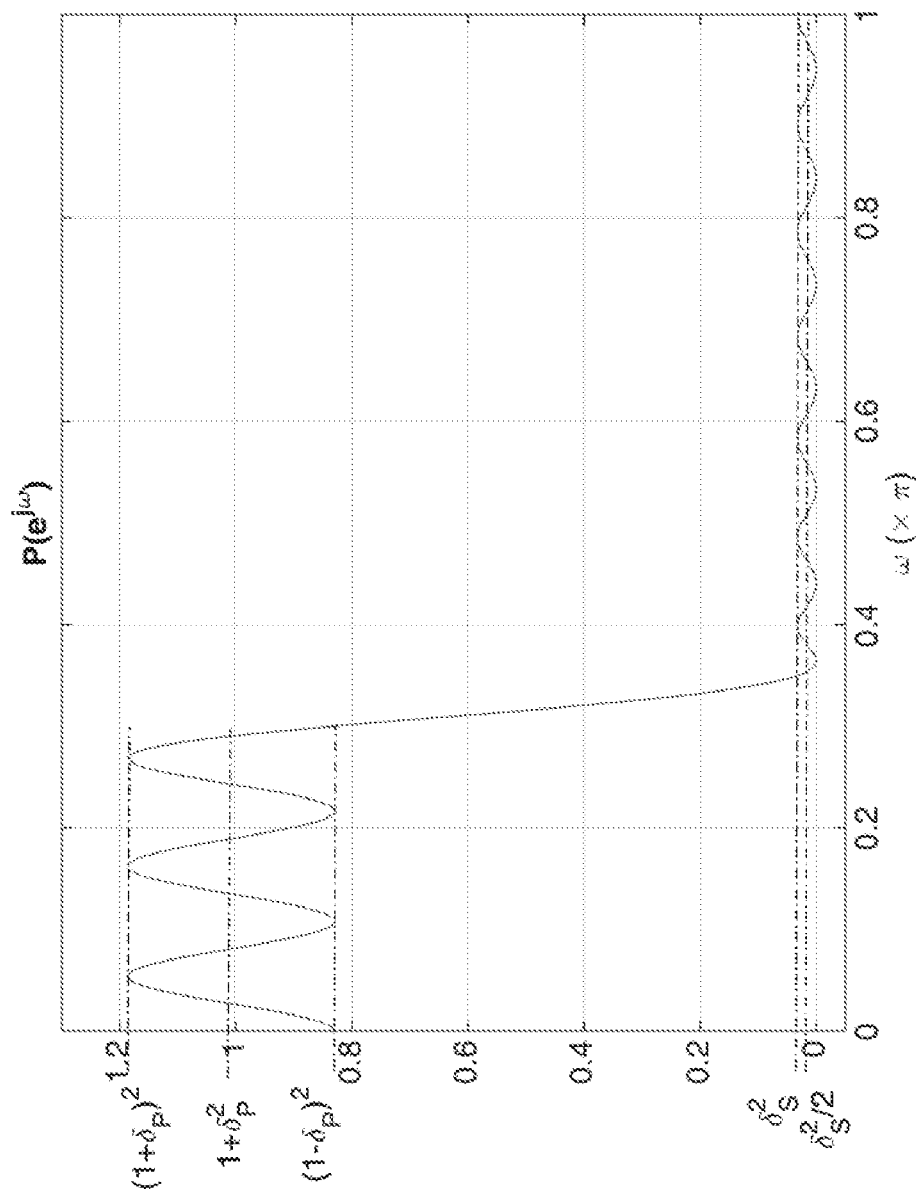
FIG. 1B illustrates an example of a frequency response ($P(e^{j\omega})$) of sequence p[n] as a function of $\omega$, according to some embodiments of the disclosure.

The optimal autocorrelation function or, equivalently, its Fourier Transform such as the one shown in FIG. 1B, may be designed hypothetically by using e.g. the Remez Exchange algorithm to approximate a target function which is $1+\delta_P^2$ in the passband and $\delta_S^2/2$ in the stopband. Since the autocorrelation sequence is of length 2N+1 and symmetric, at least N+2 alternations are required, which is also the required condition for optimality of the final design by the characterization theorem provided above. However, $\delta_P$ and $\delta_S$ are not known in advance, so the target function is not known a priori for the Remez Exchange algorithm.

One approach that may be used to obtain such an autocorrelation is to choose the target function to be the ideal filter response, which is unity in the passband and zero in the stopband, and choose the weight on stopband such that the frequency response of the obtained filter $G(e^{j\omega})$ can be scaled and shifted to look like the Fourier transform of the autocorrelation shown in FIG. 1B. To that end, first, a zero-phase filter $g[n]$ is designed, for example using the Parks-McClellan design method, to obtain a frequency response similar to that shown in FIG. 2 where the passband ripple size is $\Delta_P$ and the stopband ripple size is $\Delta_S$. A scaling coefficient a and a shifting coefficient b (in the following sometimes referred to, together, as "scale and shift coefficients") can be chosen such that the midpoints of the passband and stopband range matches to that of the autocorrelation in FIG. 1B. Furthermore, the scale and shift coefficients a and b can be chosen such that the extremal values of the design in FIG. 2 match the extremal values of the autocorrelation in FIG. 1B after the scaling and the shifting. What is also required is that the resulting $\delta_P$ and $\delta_S$ satisfy the original weight constraint specified, namely that $$\frac{\delta_P}{\delta_S} = K_{des}. \qquad (9)$$

Figure 2:
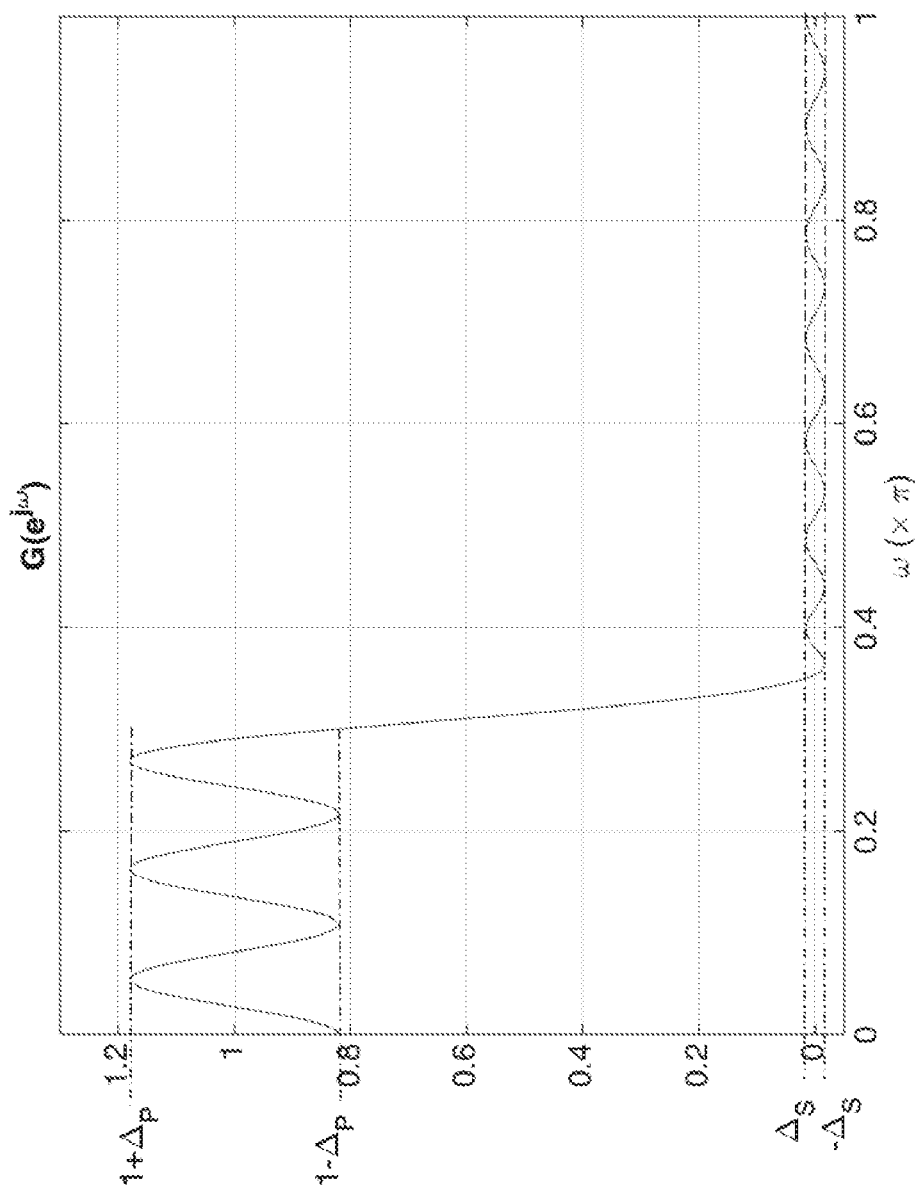
FIG. 2 illustrates an example of a frequency response ($G(e^{j\omega})$) of sequence g[n] as a function of $\omega$, according to some embodiments of the disclosure.

With those constraints, a relationship between the weight K that needs to be used in designing the filter in FIG. 2 and the resulting $\Delta_P$ can be identified as follows:

$$\Delta_P = \frac{8K_{des}^2 K}{K^2 + 16K_{des}^4 - 8K_{des}^2} \qquad (10)$$

The mathematical details on the derivation of the relationship of equation (10) are provided below.

Equation (10) provides an implicit and non-linear equation that can be solved efficiently, for example using an iterative procedure. In various embodiments of using an iterative procedure for solving equation (10), the search space on K may be cut at each iteration in e.g. a binary search fashion or using Newton-Raphson method. Once the appropriate value of K is found (i.e. a value of K for which $\Delta_P$ computed from the $G(e^{j\omega})$ is equal to the right-hand side of equation (10)), the filter can be designed by shifting and scaling $G(e^{j\omega})$ to obtain the frequency response of the autocorrelation $P(e^{j\omega})$ in FIG. 1B, and then recover the filter coefficients h[n] as described in the second step of the two-step design algorithm described in the previous section.

D. Overall Algorithm for Designing a Filter

Figure 3:
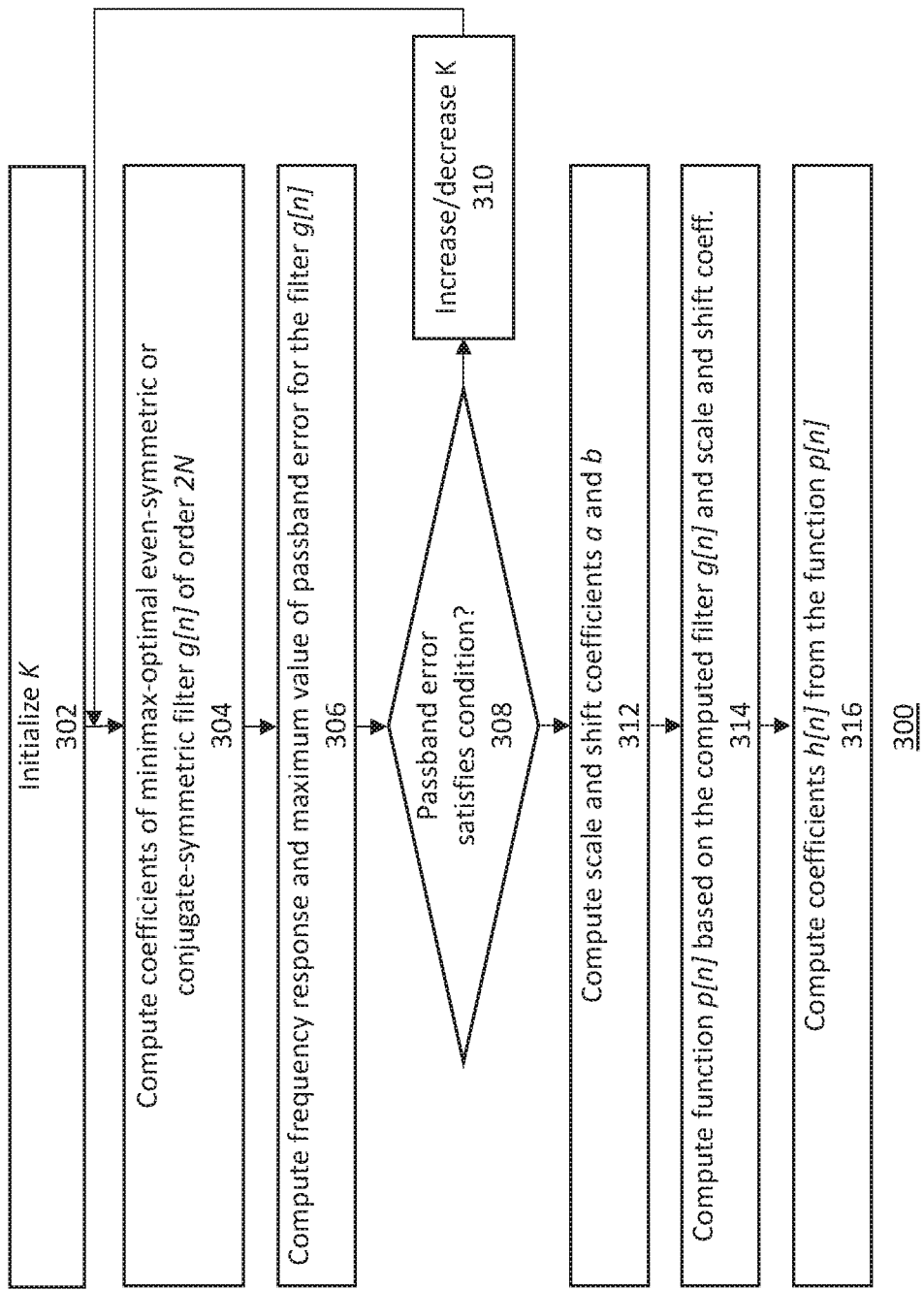
FIG. 3 provides a flow diagram of a method for computing coefficients h[n] of an FIR filter of order N with a minimax-optimal magnitude response $|H(e^{j\omega})|$, according to some embodiments of the disclosure.

FIG. 3 provides a flow diagram of a method 300 for computing coefficients h[n] of an FIR filter of order N (therefore, the filter has N+1 coefficients) with a minimax-optimal magnitude response $|H(e^{j\omega})|$, according to some embodiments of the disclosure. The method of FIG. 3 may be carried out by any suitable processing device, such as, but not limited to, the filter configuration unit 404, possibly with the assistance of the processor 406 described below. Although descriptions of the steps of the method 300 that are provided below refer to the elements shown in FIG. 4, any processing device implementing the steps of the method 300, in any order, is within the scope of the present disclosure.

Figure 4:
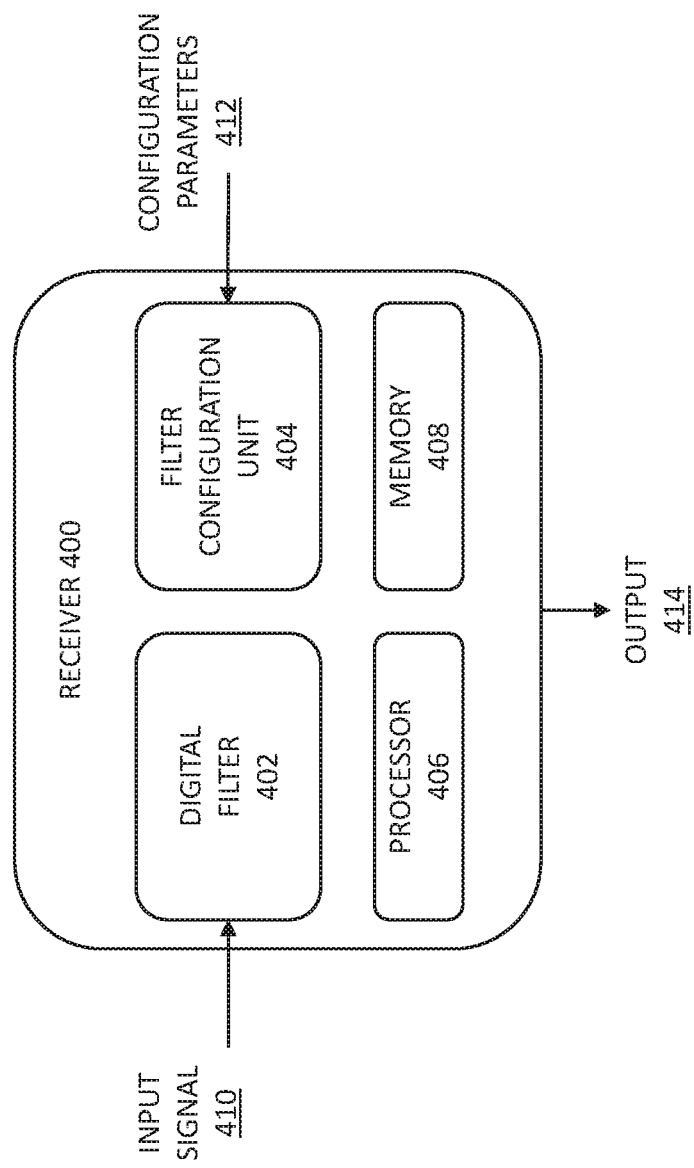
FIG. 4 provides a schematic illustration of a receiver, according to some embodiments of the disclosure.

Prior to the start of the method 300, the filter configuration unit 404 may be provided with a set of filter configuration parameters, shown in the system illustration of FIG. 4 as configuration parameters 412. Such configuration parameters may specify details of a filter that is to be designed (i.e. to specify a filter for which coefficients h[n] are to be determined as described herein). The configuration parameters may include a filter order N, the desired passband and stopband frequencies ($\Omega_P$ and $\Omega_S$), a desired magnitude response $D(\omega)$, and a desired weight function $W_{des}(\omega)$. In addition, the configuration parameters may optionally include specification of a final phase characteristic for the design. For example, even though the present disclosure does not restrict the phase during the computation of the minimax-optimal magnitude response, once such a magnitude response is computed, the designer may choose to obtain the coefficients for the minimum phase filter or the maximum phase filter that exhibits the computed optimal magnitude response. The designer may choose to provide this preference for the final phase characteristic as a configuration parameter. If this input is not provided upfront, the method 300 may be configured to return any or all of the filters that exhibit the computed optimal magnitude response and the designer can make a choice at that point, e.g. via an appropriately configured user interface.

The method 300 may begin with the filter configuration unit 404, at 302, initializing K (i.e., given $\Omega_S$, $\Omega_P$ and $K_{des}$, setting an initial guess for K). In some embodiments, K may advantageously be selected such that $K \geq 4K_{des}(K_{des}+1)$, for a physically meaningful design.

At 304, the filter configuration unit 404 computes coefficients of the minimax-optimal even-symmetric or conjugate-symmetric (zero-phase in both cases) filter g[n] of order 2N. The coefficients are computed to approximate the target function $$D(\omega) = \begin{cases} 1, & \omega \in \Omega_p \\ 0, & \omega \in \Omega_s \end{cases} \quad (11)$$

with the weight function $$W(\omega) = \begin{cases} 1, & \omega \in \Omega_p \\ K, & \omega \in \Omega_s \end{cases}. \quad (12)$$

To that end, the filter configuration unit 404 may be configured to use the Remez Exchange algorithm, the Parks-McClellan algorithm, or any other method as known in the art.

In step 306, the filter configuration unit 404 may compute $G(e^{j\omega})$, the frequency response of g[n], and the maximum value of passband error $\Delta_P$ for this g[n], the latter being equivalent to the maximum value of the absolute weighted error $|W(\omega)(G(e^{j\omega})-D(\omega))|$.

In step 308, the filter configuration unit 404 determines whether the value of the passband error $\Delta_P$ computed in step 306 satisfies the equality in equation (10) (i.e. whether the value of the passband error computed in step 306 is equal to the value of the right-hand side of the equation (10)). If so, then the method 300 proceeds to step 312. Otherwise, as shown in FIG. 3 with step 310, if the passband error $\Delta_P$ computed in step 306 is smaller than the value of the expression in the right-hand side of the equation (10), then the filter configuration unit 404 increases the value of K and the method proceeds back to step 304, while, if $\Delta_P$ is greater then the expression in equation (10), then the value of K is decreased and then the method 300 goes back to step 304. In various embodiments, the amount by which K is increased or decreased in step 310, or the bounds of the search space, can be decided in several ways, including methods such as binary search, Newton-Raphson method, or any other appropriate method. Regardless of the method, in some embodiments, values of K may be selected to satisfy $K \geq 4K_{des}(K_{des}+1)$ for a physically meaningful design.

In step 312, the filter configuration unit 404 may compute the scale and shift coefficients a and b, e.g. using equations (24) and (25).

In step 314, the filter configuration unit 404 may compute the function p[n] from the function g[n] determined in step 304, using the scale and shift coefficients computed in step 312. In some embodiments, the function p[n] may be computed as $p[n]=a \cdot g[n]+b \cdot \delta[n]$, where $\delta[n]$ is the unit impulse function (not to be confused with passband or stopband ripples of $|H(e^{j\omega})|$, namely $\delta_P$ or $\delta_S$). This p[n] is the autocorrelation sequence that was sought after.

In step 316, the filter configuration unit 404 may compute the coefficients of h[n] based on the autocorrelation sequence p[n] using any method, e.g. including but not limited to spectral factorization method or using the Discrete Hilbert Transformation relationship between the magnitude and phase of a minimum phase filter, also known as the Bayard-Bode relation.

There will be more than one filter for which the autocorrelation sequence is p[n]. Depending on what kind of phase is specified by the design (as provided or pre-stored in the filter configuration unit 404), e.g. minimum phase or maximum phase, the filter configuration unit 404 may be configure to appropriately choose one or more filters, particularly if spectral factorization is used. Otherwise, if the Bayard-Bode relation is used, the resulting filter will be a minimum phase filter. However, as one skilled in the art will recognize, other phase characteristics can be obtained from a minimum phase filter through replacing "zeros" of the filter with their conjugate reciprocals as desired. Once the locations of their zeros are determined, the coefficients of filters with other phase characteristics can be computed using the relationship between a polynomial and its roots, as known in the art.

Derivation of Equation (10)

This section presents the derivation of the equation (10) provided above.

The scaling coefficient a and the shifting coefficient b may be selected such than the midpoints of the passband and stopband range matches to that of the autocorrelation in FIG. 1B. More specifically $$a \cdot 1 + b = 1 + \delta_P^2 \quad (13)$$

and $$a \cdot 0 + b = \frac{\delta_S^2}{2} \quad (14)$$

which yields $$a = 1 + \delta_P^2 - \frac{\delta_S^2}{2} \quad (15)$$

and $$b = \frac{\delta_S^2}{2} \quad (16)$$

The relative weight between passband and stopband does not change after scaling the filter response to match that of the autocorrelation, therefore the weights may be identical in both:

$$\frac{(1+\delta_P)^2 - (1-\delta_P)^2}{\delta_S^2} = \frac{4\delta_P}{\delta_S^2} = \frac{\Delta_P}{\Delta_S} = K \quad (17)$$

Since $\delta_P/\delta_S = K_{des}$, K may be written as $$K = \frac{4K_{des}}{\delta_S} \quad (18)$$

or $$\delta_S = \frac{4K_{des}}{K} \quad (19)$$

In order to match the upper bound of the filter response in the stopband to that of the autocorrelation after the scale and shift, $$\delta_S^2 = a \cdot \Delta_S + b. \quad (20)$$

Inserting the values of the scale and shift coefficients a and b from equations (15) and (16), and inserting $$\delta_S^2 = \frac{16K_{des}^2}{K^2}$$

from equation (19) into the equation (20) results in the following:

$$\frac{16K_{des}^2}{K^2} = \left(1 + \frac{16K_{des}^4}{K^2} - \frac{8K_{des}^2}{K^2}\right)\Delta_S + \frac{8K_{des}^2}{K^2} \quad (21)$$

Solving equation (21) for $\Delta_S$ yields $$\Delta_S = \frac{8K_{des}^2}{K^2 + 16K_{des}^4 - 8K_{des}^2}. \quad (22)$$

and, since $\Delta_P = K\Delta_S$, the following is obtained:

$$\Delta_P = \frac{8K_{des}^2 K}{K^2 + 16K_{des}^4 - 8K_{des}^2} \quad (23)$$

Finally, once the appropriate weight K that satisfies this equation is found, the scale and shift coefficients can be computed directly from the parameters of this filter. Using equation (19) and (16), the shifting coefficient b may be determined as:

$$b = \frac{8K_{des}^2}{K^2} \quad (24)$$

From equations (24) and (20), the scaling coefficient a may be determined as:

$$a = \frac{8K_{des}^2}{K^2 \Delta_S} = \frac{8K_{des}^2}{K\Delta_P}. \quad (25)$$

System View of an Improved Receiver and Digital Filter

FIG. 4 provides a schematic illustration of an exemplary receiver 400, according to some embodiments of the disclosure. As shown, the receiver 400 may include a digital filter 402 and a filter configuration unit 404. The digital filter 402 is configured to filter an input signal 410 received by a receiver 400, received as an input to the digital filter 402, to generate a filtered signal, shown in FIG. 4 as an output 414. The input signal 410 may be a pre-processed signal, e.g. by being converted from analog to digital domain and possibly processed to reduce or eliminate noise. The digital filter 402 is designed as a filter with coefficients h[n], which coefficients are computed by the filter configuration unit 404 based on configuration parameters 412 provided to the filter configuration unit 404. In various embodiments, at least some of the configuration parameters 412 may be provided externally, e.g. provided by a user using any suitable interface, while some of the parameters 412 may be pre-stored in the filter configuration unit 404.

As also shown in FIG. 4, the receiver 400 may include at least one processor 406 and at least one memory element 408, along with any other suitable hardware and/or software to enable its intended functionality of assisting configuration of the digital filter 402 with appropriate filter coefficients and filtering the input signal 410 as described herein. In some embodiments, the processor 406 can execute software or an algorithm to perform the activities as discussed in this Specification, e.g. the processor 406 can execute the algorithms for computing filter coefficients h[n] by performing steps as described herein, e.g. with reference to FIG. 3. Thus, although shown as separate elements in FIG. 4, the processor 406 and/or the memory 408 may be considered to be a part of the filter configuration unit 404 and/or a part of the digital filter 402.

It should be noted that, in order to not clutter the drawing, receiver 400 illustrates signal processing components of a receiver and does not illustrate other components which are typically present in receivers. For example, a person of ordinary skill in the art would recognize that the receiver 400 may further include one or more antennas for receiving signals, an integrated circuit that can provide an analog front end for receiving signals and converting analog input signals to digital data samples of the analog input signal, various interface ports, etc. In an embodiment, an analog front end can be configured to communicate with the processor 406 to provide digital data samples, which the processor 406 would process to filter signals with frequency contributions of interest $\Omega_P$, while cancelling, reducing, or rendering below the noise threshold of the detection mechanism contributions to the received signals at frequencies $\omega \in \Omega_S$ other than those in the band of interest.

Teachings provided herein are applicable to digital filters configured to filter electromagnetic signals in various frequency ranges (e.g. in the radio range, in the optical range, etc.). Furthermore, these teachings are applicable to digital filtering of signals detected by receivers other than electromagnetic receivers, such as e.g. sonar receivers.

The processor 406 may be configured to communicatively couple to other system elements via one or more interconnects or buses. Such a processor may include any combination of hardware, software, or firmware providing programmable logic, including by way of non-limiting example a microprocessor, a digital signal processor (DSP), a field-programmable gate array (FPGA), a programmable logic array (PLA), an application specific integrated circuit (ASIC), or a virtual machine processor. The processor 406 may be communicatively coupled to the memory element 408, for example in a direct-memory access (DMA) configuration. Such a memory element may include any suitable volatile or non-volatile memory technology, including double data rate (DDR) random access memory (RAM), synchronous RAM (SRAM), dynamic RAM (DRAM), flash, read-only memory (ROM), optical media, virtual memory regions, magnetic or tape memory, or any other suitable technology. Any of the memory items discussed herein should be construed as being encompassed within the broad term "memory element." The information being tracked or sent to the digital filter 402, the filter configuration unit 404, the processor 406, or the memory 408 could be provided in any database, register, control list, cache, or storage structure, all of which can be referenced at any suitable timeframe. Any such storage options may be included within the broad term "memory element" as used herein. Similarly, any of the potential processing elements, modules, and machines described herein should be construed as being encompassed within the broad term "processor." Each of the elements shown in FIG. 4, e.g. to the digital filter 402 and the filter configuration unit 404, can also include suitable interfaces for receiving, transmitting, and/or otherwise communicating data or information in a network environment.

In certain example implementations, mechanisms for assisting configuration of the digital filter 402 and filtering of the input signal 410 as outlined herein may be implemented by logic encoded in one or more tangible media, which may be inclusive of non-transitory media, e.g., embedded logic provided in an ASIC, in DSP instructions, software (potentially inclusive of object code and source code) to be executed by a processor, or other similar machine, etc. In some of these instances, memory elements, such as e.g. memory 408 shown in FIG. 4, can store data or information used for the operations described herein. This includes the memory elements being able to store software, logic, code, or processor instructions that are executed to carry out the activities described herein. A processor can execute any type of instructions associated with the data or information to achieve the operations detailed herein. In one example, the processors, such as e.g. the processor 406 shown in FIG. 4, could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., an FPGA, a DSP, an erasable programmable read-only memory (EPROM), an electrically erasable programmable read-only memory (EEPROM)) or an ASIC that includes digital logic, software, code, electronic instructions, or any suitable combination thereof.

Exemplary Data Processing System

Figure 5:
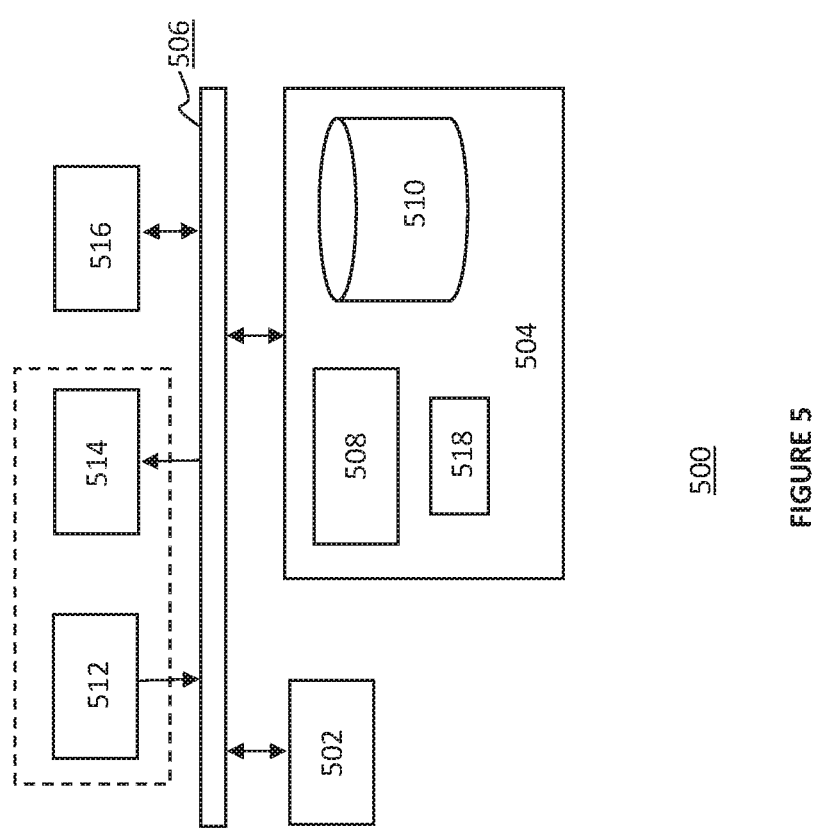
FIG. 5 depicts a block diagram illustrating an exemplary data processing system, according to one embodiment of the present disclosure.

FIG. 5 depicts a block diagram illustrating an exemplary data processing system 500, according to one embodiment of the present disclosure. Such a data processing system could be configured to any system configured to implement the FIR design techniques described herein.

As shown in FIG. 5, the data processing system 500 may include at least one processor 502 coupled to memory elements 504 through a system bus 506. As such, the data processing system may store program code within memory elements 504. Further, the processor 502 may execute the program code accessed from the memory elements 504 via a system bus 506. In one aspect, the data processing system may be implemented as a computer that is suitable for storing and/or executing program code. It should be appreciated, however, that the data processing system 500 may be implemented in the form of any system including a processor and a memory that is capable of performing the functions described within this specification.

The memory elements 504 may include one or more physical memory devices such as, for example, local memory 508 and one or more bulk storage devices 510. The local memory may refer to random access memory or other non-persistent memory device(s) generally used during actual execution of the program code. A bulk storage device may be implemented as a hard drive or other persistent data storage device. The processing system 500 may also include one or more cache memories (not shown) that provide temporary storage of at least some program code in order to reduce the number of times program code must be retrieved from the bulk storage device 510 during execution.

Input/output (I/O) devices depicted as an input device 512 and an output device 514, optionally, can be coupled to the data processing system. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 5 with a dashed line surrounding the input device 512 and the output device 514). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 516 may also, optionally, be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 500, and a data transmitter for transmitting data from the data processing system 500 to said systems, devices and/or networks. Modems, cable modems, and Ethernet cards are examples of different types of network adapter that may be used with the data processing system 500.

As pictured in FIG. 5, the memory elements 504 may store an application 518. In various embodiments, the application 518 may be stored in the local memory 508, the one or more bulk storage devices 510, or apart from the local memory and the bulk storage devices. It should be appreciated that the data processing system 500 may further execute an operating system (not shown in FIG. 5) that can facilitate execution of the application 518. The application 518, being implemented in the form of executable program code, can be executed by the data processing system 500, e.g., by the processor 502. Responsive to executing the application, the data processing system 500 may be configured to perform one or more operations or method steps described herein.

Selected Examples

In a first set of Examples, Examples A, Example 1A provides a computer-implemented method for determining coefficients h[n], where n=0, 1, ..., N, of a finite impulse response (FIR) digital filter of order N having a magnitude response configured to approximate a response of an ideal FIR filter configured to pass components of signals at frequencies w within a set of passband frequencies $\Omega_P$ and to suppress components of signals at frequencies within a set of stopband frequencies $\Omega_S$ so that a ratio of an error in the set of passband frequencies $\Omega_P$ (i.e. an error $\delta_P$ for frequencies $\omega \in \Omega_P$) and an error in the set of stopband frequencies $\Omega_S$ (i.e. error $\delta_S$ for frequencies $\omega \in \Omega_S$) is equal to or within a tolerance range of $K_{des}$, the method including: initializing a value of a scalar K; determining coefficients g[n] of a minimax-optimal even-symmetric or conjugate-symmetric filter (even-symmetric if h[n] is restricted to real-valued coefficients, and conjugate-symmetric if h[n] is allowed to take on complex-valued coefficients) of order 2N to approximate a response of an FIR filter configured to pass components of signals at frequencies within the set of passband frequencies $\Omega_P$ and to suppress components of signals at frequencies within the set of stopband frequencies $\Omega_S$ so that a ratio of an error in the set of passband frequencies $\Omega_P$ (i.e. an error $\Delta_P$ for frequencies $\omega \in \Omega_P$) and an error in the set of stopband frequencies $\Omega_S$ (i.e. an error $\Delta_S$ for frequencies $\omega \in \Omega_S$) is equal to or within a tolerance range of K; determining a frequency response $G(e^{j\omega})$ of the minimax-optimal even-symmetric or conjugate-symmetric filter with the determined coefficients g[n]; determining a maximum passband error $\Delta_P$ from the determined frequency response $G(e^{j\omega})$; determining whether the determined maximum passband error $\Delta_P$ satisfies a predefined condition with respect to a comparison value based on values of the scalars K and $K_{des}$; and when the determined maximum passband error $\Delta_P$ satisfies the condition with respect to the comparison value, computing a set of values p[n] by scaling the determined coefficients g[n] by a first scaling value a and adding to the scaled coefficients a*g[n] a unit impulse $\delta[n]$ scaled by a second scaling value b, and determining the coefficients h[n] as a set of (N+1) values for which the set of values p[n] is an autocorrelation sequence.

Example 2A provides the method according to Example 1A, where determining the coefficients g[n] of the minimax-optimal even-symmetric or conjugate-symmetric filter includes determining the coefficients g[n] using a Remez Exchange algorithm or a Parks-McClellan algorithm.

Example 3A provides the method according to Examples 1A or 2A, where determining the frequency response $G(e^{j\omega})$ of the minimax-optimal even-symmetric or conjugate-symmetric filter includes computing a Fourier transform of the determined coefficients g[n].

Example 4A provides the method according to any one of the preceding Examples A, where determining the maximum passband error $\Delta_P$ includes determining a maximum absolute deviation of a value of $G(e^{j\omega})$ from a value of 1 for frequencies within the set of passband frequencies $\Omega_P$.

Example 5A provides the method according to any one of the preceding Examples A, where the comparison value is a value indicative of (e.g. equal or proportional to)

$$\frac{8K_{des}^2 K}{K^2 + 16K_{des}^4 - 8K_{des}^2}.$$

Example 6A provides the method according to any one of Examples 1A-5A, where the condition with respect to the comparison value includes a difference between the determined maximum passband error $\Delta_P$ and the comparison value being within a predefined margin with respect to 0.

Example 7A provides the method according to any one of Examples 1A-5A, where the condition with respect to the comparison value includes a ratio between the determined maximum passband error $\Delta_P$ and the comparison value being within a predefined margin with respect to 1.

Example 8A provides the method according to any one of Examples 1A-5A, where the condition with respect to the comparison value includes the determined maximum passband error $\Delta_P$ being equal to the comparison value.

Example 9A provides the method according to any one of the preceding Examples A, where the scaling coefficient a is equal to $$\frac{8K_{des}^2}{K\Delta_P}.$$

Example 10A provides the method according to any one of the preceding Examples A, where the shifting coefficient b is equal to $$\frac{8K_{des}^2}{K^2}.$$

Example 11A provides the method according to any one of the preceding Examples A, where determining the coefficients h[n] as the set of (N+1) values for which the set of values p[n] is the autocorrelation sequence includes performing spectral factorization on the set of values p[n] or using the Discrete Hilbert Transformation relationship between the magnitude response and phase response of a minimum phase filter also known as the Bayard-Bode relation.

Example 12A provides the method according to any one of the preceding Examples A, where determining the coefficients h[n] as the set of (N+1) values for which the set of values p[n] is the autocorrelation sequence includes determining two or more sets of the (N+1) values for which the set of values p[n] is the autocorrelation sequence, each set of the (N+1) values associated with a different phase characteristic.

Example 13A provides the method according to Example 12A, further including selecting a set of (N+1) values from the two or more sets of the (N+1) values for which the set of values p[n] is the autocorrelation sequence with a specified phase characteristic.

Example 14A provides the method according to Example 13A, where the specified phase characteristic includes one of a minimum phase or a maximum phase.

Example 15A provides the method according to any one of the preceding Examples A, where, when the determined maximum passband error $\Delta_P$ does not satisfy the condition with respect to the comparison value, the method further includes: performing iterations of changing a value of the scalar K from that for which the determined maximum passband error $\Delta_P$ did not satisfy the condition with respect to the comparison value, and repeating, for the changed value of the scalar K, determination of the coefficients g[n] of the minimax-optimal even-symmetric or conjugate-symmetric filter, determination of the frequency response $G(e^{j\omega})$, determination of the maximum passband error $\Delta_P$, and determination of whether the determined maximum passband error $\Delta_P$ satisfies the condition with respect to the comparison value, until the determined maximum passband error $\Delta_P$ satisfies the condition with respect to the comparison value.

Methods by which K is incremented or decremented include, but not limited to binary search methods, or Newton-Raphson method, etc., all of which are within the scope of the present disclosure.

In a second set of Examples, Examples B, Example 1B provides a system for filtering a signal received by an electromagnetic receiver. The system includes a filter configuration unit and a digital filter. The filter configuration unit is for configuring a first filter of order N to be applied to the signal by determining coefficients h[n] of the first filter, where a target response of the first filter is specified by a target (desired) response function $D(\omega)$ and a variable $K_{des}$ indicative of a target ratio of an error in a set of passband frequencies $\Omega_P$ and an error in a set of stopband frequencies $\Omega_S$ of the first filter. The filter configuration unit is configured to determine the coefficients of the first filter by iterating steps of i) setting a variable K indicative of a ratio of an error in the set of passband frequencies $\Omega_P$ and an error in the set of stopband frequencies $\Omega_S$ of a second filter of order 2N to a new value, and ii) determining coefficients g[n] of the second filter with a target response specified by the target response function $D(\omega)$ and the variable K, until a maximum passband error $\Delta_P$ of a frequency response $G(e^{j\omega})$ of the second filter satisfies a condition with respect to a comparison value based on the variables K and $K_{des}$. The filter configuration unit is further configured for determining the coefficients h[n] of the first filter based on the coefficients g[n] of the second filter. The digital filter is configured to then generate a filtered signal by applying the first filter with the computed coefficients h[n] to the signal.

Example 2B provides the system according to Example 1A, where the second filter is a minimax-optimal even-symmetric filter and the coefficients h[n] of the first filter include real values.

Example 3B provides the system according to Example 1A, where the second filter is a minimax-optimal conjugate-symmetric filter and the coefficients h[n] of the first filter include complex values.

Example 4B provides the system according to any one of the preceding Examples B, where determining the coefficients h[n] of the first filter based on the coefficients g[n] of the second filter includes computing a set of values p[n] by scaling the coefficients g[n] of the second filter by a scaling coefficient a and adding a unit impulse $\delta[n]$ scaled by a shifting coefficient b, and determining the coefficients h[n] of the first filter as a set of (N+1) values for which the computed set of values p[n] is an autocorrelation sequence.

Example 5B provides the system according to Example 4B, where the scaling coefficient a is equal to $$\frac{8K_{des}^2}{K\Delta_P}.$$

Example 6B provides the system according to Examples 4B or 5B, where the shifting coefficient b is equal to $$\frac{8K_{des}^2}{K^2}.$$

Example 7B provides the system according to any one of Examples 4B-6B, where determining the coefficients h[n] of the first filter as the set of (N+1) values for which the set of values p[n] is the autocorrelation sequence includes performing a spectral factorization on the set of values p[n] or applying a Bayard-Bode relation to a square root of a frequency response of the set of values p[n], namely $|H(e^{j\omega})| = \sqrt{P(e^{j\omega})}$.

Example 8B provides the system according to any one of Examples 4B-7B, where determining the coefficients h[n] as the set of (N+1) values for which the set of values p[n] is the autocorrelation sequence includes determining two or more sets of the (N+1) values for which the set of values p[n] is the autocorrelation sequence, each set of the (N+1) values associated with a different phase characteristic.

Example 9B provides the system according to Example 6B, further including selecting a set of (N+1) values from the two or more sets of the (N+1) values for which the set of values p[n] is the autocorrelation sequence with a specified phase characteristic.

Example 10B provides the system according to Example 9B, where the specified phase characteristic includes one of a minimum phase or a maximum phase.

Example 11B provides the system according to any one of the preceding Examples B, where determining the coefficients g[n] of the second filter includes using a Remez Exchange algorithm or a Parks-McClellan algorithm.

Example 12B provides the system according to any one of the preceding Examples B, where determining the maximum passband error $\Delta_P$ includes determining a value indicative of a maximum absolute deviation of the frequency response $G(e^{j\omega})$ of the second filter from a value of 1 for frequencies within the set of passband frequencies $\Omega_P$.

Example 13B provides the system according to any one of the preceding Examples B, where the comparison value is a value indicative of $$\frac{8K_{des}^2 K}{K^2 + 16K_{des}^4 - 8K_{des}^2}.$$

Example 14B provides the system according to any one of Examples 1B-13B, where the condition with respect to the comparison value includes a difference between the maximum passband error $\Delta_P$ and the comparison value being within a margin with respect to 0.

Example 15B provides the system according to any one of Examples 1B-13B, where the condition with respect to the comparison value includes a ratio between the maximum passband error $\Delta_P$ and the comparison value being within a margin with respect to 1.

Example 16B provides the system according to any one of Examples 1B-13B, where the condition with respect to the comparison value includes the maximum passband error $\Delta_P$ being equal to the comparison value.

Example 17B provides the system according to any one of the preceding Examples B, where the target response of the second filter is a response of the second filter for which a ratio of an error due to a difference between the response of the second filter and the target response function $D(\omega)$ in the set of passband frequencies $\Omega_P$ and an error due to a difference between the response of the second filter and the target response function $D(\omega)$ in the set of stopband frequencies $\Omega_S$ is equal to or within a tolerance range of the variable K.

In another Example B according to any one of the preceding Examples B, the target response of the first filter a response of the first filter for which a ratio of an error due to a difference between the response of the first filter and the target response function $D(\omega)$ in the set of passband frequencies $\Omega_P$ and an error due to a difference between the response of the first filter and the target response function $D(\omega)$ in the set of stopband frequencies $\Omega_S$ is equal to or within a tolerance range of the variable $K_{des}$.

Example 18B provides the system according to any one of the preceding Examples B, where each of the first filter and the second filter is a finite impulse response (FIR) filter.

Example 19B provides a computer-implemented method for operating a digital filter. The method includes computing coefficients h[n] of a first filter of order N, where a target response of the first filter is specified by a target response function $D(\omega)$ and a variable $K_{des}$ indicative of a target ratio of an error in a set of passband frequencies $\Omega_P$ and an error in a set of stopband frequencies $\Omega_S$ of the first filter, by performing one or more iterations of i) setting a variable K indicative of a ratio of an error in the set of passband frequencies $\Omega_P$ and an error in the set of stopband frequencies $\Omega_S$ of a second filter of order 2N to a new value, and ii) determining coefficients g[n] of the second filter, where a target response of the second filter is specified by the target response function $D(\omega)$ and the variable K, where the iterations are performed until a maximum passband error $\Delta_P$ of a frequency response $G(e^{j\omega})$ of the second filter satisfies a condition with respect to a comparison value based on the variables K and $K_{des}$. The method further includes determining the coefficients h[n] of the first filter based on the coefficients g[n] of the second filter; and configuring the digital filter to apply the first filter with the coefficients h[n] to a signal to generate a filtered signal.

Example 20B provides the method according to Example 19B, further including receiving a value of the order N, the target response function $D(\omega)$ and the variable $K_{des}$ via a user interface.

Further Examples provide the methods according to Examples 19B or 20B, the methods further including steps of operating the system according to any one of Examples 1B-18B.

Other Examples provides a system comprising means for implementing the method according to any one of the preceding Examples, a computer program configured to implement the method according to any one of the preceding Examples, one or more non-transitory tangible media encoding logic that include instructions for execution that, when executed by a processor, are operable to perform operations of the method according to any one of the preceding Examples, and a system including at least one memory element configured to store computer executable instructions, and at least one processor coupled to the at least one memory element and configured, when executing the instructions, to carry out the method according to any one of the preceding Examples.

VARIATIONS AND IMPLEMENTATIONS

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

In one example embodiment, parts or entire electrical circuits of the FIGURES may be implemented on a motherboard of an associated electronic device. The motherboard can be a general circuit board that can hold various components of the internal electronic system of the electronic device and, further, provide connectors for other peripherals. More specifically, the motherboard can provide the electrical connections by which the other components of the system can communicate electrically. Any suitable processors (inclusive of digital signal processors, microprocessors, supporting chipsets, etc.), memory elements, etc. can be suitably coupled to the motherboard based on particular configuration needs, processing demands, computer designs, etc. Other components such as external storage, additional sensors, controllers for audio/video display, and peripheral devices may be attached to the motherboard as plug-in cards, via cables, or integrated into the motherboard itself.

In another example embodiment, parts or entire electrical circuits of the FIGURES may be implemented as stand-alone modules (e.g., a device with associated components and circuitry configured to perform a specific application or function) or implemented as plug-in modules into application specific hardware of electronic devices. Note that particular embodiments of the present disclosure may be readily included in a system on chip (SOC) package, either in part, or in whole. An SOC represents an IC that integrates components of a computer or other electronic system into a single chip. It may contain digital, analog, mixed-signal, and often radio frequency functions: all of which may be provided on a single chip substrate. Other embodiments may include a multi-chip-module (MCM), with a plurality of separate ICs located within a single electronic package and configured to interact closely with each other through the electronic package. In various other embodiments, the amplification functionalities may be implemented in one or more silicon cores in Application Specific Integrated Circuits (ASICs), Field Programmable Gate Arrays (FPGAs), and other semiconductor chips.

It is also imperative to note that all of the specifications, dimensions, and relationships outlined herein (e.g., the number of processors and memory elements, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular processor and/or component arrangements. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that parts or entire electrical circuits of the FIGURES and its teachings are readily scalable and can accommodate a large number of components, as well as more complicated/sophisticated arrangements and configurations. Accordingly, the examples provided should not limit the scope or inhibit the broad teachings of parts or entire electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Although the claims may be presented in single dependency format in the style used before the USPTO, it should be understood that any claim can depend on and be combined with any preceding claim of the same type unless that is clearly technically infeasible.

What is claimed is:

1. A system for filtering a signal received by a receiver, the system comprising:
   a filter configuration unit for determining coefficients h[n] of a first filter of order N, the first filter having a target magnitude response specified by a target response function $D(\omega)$ and a variable $K_{des}$ indicative of a target ratio of an error in a set of passband frequencies $\Omega_P$ and an error in a set of stopband frequencies $\Omega_S$ of the first filter by:
   iterating steps of i) setting a variable K indicative of a ratio of the error in the set of passband frequencies $\Omega_P$ and the error in the set of stopband frequencies $\Omega_S$ of a second filter of order 2N to a new value, ii) determining coefficients g[n] of the second filter having a target frequency response specified by the target response function $D(\omega)$ and the variable K, and iii) determining a frequency response $G(e^{j\omega})$ of the second filter based on the coefficients g[n], wherein the steps are iterated until a maximum passband error $\Delta_P$ of the frequency response $G(e^{j\omega})$ of the second filter satisfies a condition with respect to a comparison value based on the variables K and $K_{des}$, and
   determining the coefficients h[n] of the first filter based on the coefficients g[n] of the second filter; and
   a digital filter for generating a filtered signal by applying the first filter to the signal,
   wherein the error in the set of passband frequencies $\Omega_P$ is indicative of a deviation of a magnitude of a frequency response $H(e^{j\omega})$ of the first filter from the target response function $D(\omega)$ in the set of passband frequencies $\Omega_P$, and wherein the error in the set of stopband frequencies $\Omega_S$ is indicative of a deviation of the magnitude of the frequency response $H(e^{j\omega})$ of the first filter from the target response function $D(\omega)$ in the set of stopband frequencies $\Omega_S$.

2. The system according to claim 1, wherein the second filter is a minimax-optimal even-symmetric filter.

3. The system according to claim 1, wherein the second filter is a minimax-optimal conjugate-symmetric filter.

4. The system according to claim 1, wherein determining the coefficients h[n] of the first filter based on the coefficients g[n] of the second filter comprises:
   computing a set of values p[n] by scaling the coefficients g[n] of the second filter by a scaling coefficient a and adding a unit impulse $\delta$[n] scaled by a shifting coefficient b, and
   determining the coefficients h[n] of the first filter as a set of (N+1) values for which the set of values p[n] is an autocorrelation sequence.

5. The system according to claim 4, wherein the scaling coefficient $\alpha$ is equal to $$\frac{8K_{des}^2}{K\Delta p},$$

and wherein the shifting coefficient b is equal to $$\frac{8K_{des}^2}{K^2}.$$

6. The system according to claim 4, wherein determining the coefficients h[n] of the first filter as the set of (N+1) values comprises performing a spectral factorization on the set of values p[n].

7. The system according to claim 4, wherein determining the coefficients h[n] as the set of (N+1) values comprises determining two or more sets of the (N+1) values for which the set of values p[n] is the autocorrelation sequence, each set of the (N+1) values associated with a different phase characteristic.

8. The system according to claim 7, further comprising selecting a set of (N+1) values with a specified phase characteristic from the two or more sets of the (N+1) values for which the set of values p[n] is the autocorrelation sequence.

9. The system according to claim 8, wherein the specified phase characteristic comprises one of a minimum phase or a maximum phase.

10. The system according to claim 1, wherein determining the coefficients g[n] of the second filter comprises using a Remez Exchange algorithm or a Parks-McClellan algorithm.

11. The system according to claim 1, wherein determining the maximum passband error $\Delta_P$ comprises determining a value indicative of a maximum deviation of the frequency response $G(e^{j\omega})$ of the second filter from the target response function $D(\omega)$ for frequencies within the set of passband frequencies $\Omega_P$.

12. The system according to claim 1, wherein the comparison value is a value indicative of $$\frac{8K_{des}^2 K}{K^2 + 16K_{des}^4 - 8K_{des}^2}.$$

13. The system according to claim 1, wherein the condition with respect to the comparison value comprises a difference between the maximum passband error $\Delta_P$ and the comparison value being within a margin with respect to 0.

14. The system according to claim 1, wherein the condition with respect to the comparison value comprises a ratio between the maximum passband error $\Delta_P$ and the comparison value being within a margin with respect to 1.

15. The system according to claim 1, wherein the condition with respect to the comparison value comprises the maximum passband error $\Delta_P$ being equal to the comparison value.

16. The system according to claim 1, wherein the target frequency response of the second filter comprises:
a frequency response of the second filter for which a ratio of a maximum deviation of the frequency response of the second filter from the target response function $D(\omega)$ in the set of passband frequencies $\Omega_P$ and a maximum deviation of the frequency response of the second filter from the target response function $D(\omega)$ in the set of stopband frequencies $\Omega_S$ is equal to or within a tolerance range of the variable K.

17. The system according to claim 1, wherein the error in the set of passband frequencies $\omega_p$ is a maximum absolute error in the set of passband frequencies $\omega_p$, and wherein the error in the set of stopband frequencies $\omega_s$ is a maximum absolute error in the set of stopband frequencies $\omega_s$.

18. The system according to claim 1, wherein the deviation of the magnitude of the frequency response $H(e^{j\omega})$ of the first filter is a maximum deviation of the magnitude of the frequency response $H(e^{j\omega})$ of the first filter.

19. A computer-implemented method for operating a digital filter, the method comprising:
computing coefficients h[n] of a first filter of order N having a target magnitude response specified by a target response function $D(\omega)$ and a variable $K_{des}$ indicative of a target ratio of an error in a set of passband frequencies $\Omega_P$ and an error in a set of stopband frequencies $\Omega_S$ of the first filter, by performing one or more iterations of
i) setting a variable K indicative of a ratio of an error in the set of passband frequencies $\Omega_P$ and an error in the set of stopband frequencies $\Omega_S$ of a second filter of order 2N to a new value,
ii) determining coefficients g[n] of the second filter having a target frequency response specified by the target response function $D(\omega)$ and the variable K, and
iii) determining a frequency response $G(e^{j\omega})$ of the second filter based on the coefficients g[n],
where the iterations are performed until a maximum passband error $\Delta_P$ of a frequency response $G(e^{j\omega})$ of the second filter satisfies a condition with respect to a comparison value based on the variables K and $K_{des}$ and where the error in the set of passband frequencies $\Omega_P$ is indicative of a deviation of a magnitude of a frequency response $H(e^{j\omega})$ of the first filter from the target response function $D(\omega)$ in the set of passband frequencies $\Omega_P$, and the error in the set of stopband frequencies $\Omega_S$ is indicative of a deviation of the magnitude of the frequency response $H(e^{j\omega})$ of the first filter from the target response function $D(\omega)$ in the set of stopband frequencies $\Omega_S$;
determining the coefficients h[n] of the first filter based on the coefficients g[n] of the second filter; and
configuring the digital filter to apply the first filter with the coefficients h[n] to a signal to generate a filtered signal.

20. The method according to claim 19, further comprising receiving a value of the order N, the target response function $D(\omega)$ and the variable $K_{des}$ via a user interface.

21. A system for filtering a signal received by a receiver, the system comprising:
means for computing coefficients h[n] of a first filter of order N having a target magnitude response specified by a target response function $D(\omega)$ and a variable $K_{des}$ indicative of a target ratio of an error in a set of passband frequencies $\Omega_p$ and an error in a set of stopband frequencies $\Omega_s$ of the first filter, by performing one or more iterations of
i) setting a variable K indicative of a ratio of an error in the set of passband frequencies $\Omega_p$ and an error in the set of stopband frequencies $\Omega_s$ of a second filter of order 2N to a new value,
ii) determining coefficients g[n] of the second filter having a target frequency response specified by the target response function $D(\omega)$ and the variable K, and
iii) determining a frequency response $G(e^{j\omega})$ of the second filter based on the coefficients g[n],
where the iterations are performed until a maximum passband error $\Delta_p$ of a frequency response $G(e^{j\omega})$ of the second filter satisfies a condition with respect to a comparison value based on the variables K and $K_{Kaes}$ and where the error in the set of passband frequencies $\Omega_p$ is indicative of a deviation of a magnitude of a frequency response $H(e^{j\omega})$ of the first filter from the target response function $D(\omega)$ in the set of passband frequencies $\Omega_p$, and the error in the set of stopband frequencies $\Omega_s$ is indicative of a deviation of the magnitude of the frequency response $H(e^{j\omega})$ of the first filter from the target response function $D(\omega)$ in the set of stopband frequencies $\Omega_s$;
means for determining the coefficients h[n] of the first filter based on the coefficients g[n] of the second filter; and
means for applying the first filter with the coefficients h[n] to the signal to generate a filtered signal.

22. The system according to claim 21, further comprising means for receiving a value of the order N, the target response function D(ω) and the variable $K_{des}$ via a user interface.

* * * * *